United States Patent
Lane et al.

(10) Patent No.: US 10,683,126 B2
(45) Date of Patent: Jun. 16, 2020

(54) ETCHED PREFORM TIP

(71) Applicant: Amcor Rigid Packaging USA, LLC, Ann Arbor, MI (US)

(72) Inventors: Michael T. Lane, Brooklyn, MI (US); Luke A. Mast, Brooklyn, MI (US); Kirk Edward Maki, Tecumseh, MI (US); G. David Lisch, Jackson, MI (US)

(73) Assignee: AMCR RIGID PACKAGING USA, LLC, Ann Arbor, MI (US)

( * ) Notice: Subject to any disclaimer, the term of this patent is extended or adjusted under 35 U.S.C. 154(b) by 0 days.

(21) Appl. No.: 15/768,245

(22) PCT Filed: Oct. 16, 2015

(86) PCT No.: PCT/US2015/055977
§ 371 (c)(1),
(2) Date: Apr. 13, 2018

(87) PCT Pub. No.: WO2017/065803
PCT Pub. Date: Apr. 20, 2017

(65) Prior Publication Data
US 2018/0305064 A1    Oct. 25, 2018

(51) Int. Cl.
*B65D 1/02* (2006.01)
*B29C 49/06* (2006.01)
(Continued)

(52) U.S. Cl.
CPC ............ *B65D 1/0276* (2013.01); *B29C 49/06* (2013.01); *B29C 49/12* (2013.01);
(Continued)

(58) Field of Classification Search
CPC .... B29C 49/78; B65D 1/0276; B65D 1/0261; B65D 2501/0018; B65D 2501/0036; B29B 2911/14486
See application file for complete search history.

(56) References Cited

U.S. PATENT DOCUMENTS

| 4,286,940 A | 9/1981 | Gendron |
| 4,889,752 A | 12/1989 | Beck |
(Continued)

FOREIGN PATENT DOCUMENTS

| JP | 102198821 A | 8/1990 |
| JP | H10146880 A | 6/1998 |

OTHER PUBLICATIONS

Supplementary European Search Report dated Apr. 5, 2019 issued in corresponding European Patent Application No. 15906398.1.
(Continued)

*Primary Examiner* — Shawn M Braden
(74) *Attorney, Agent, or Firm* — Harness, Dickey & Pierce, P.L.C.

(57) ABSTRACT

A method of inspecting a blow molded container having a finish, a base, a body between the finish and base, and etching at the base. The method includes identifying where on the base the etching is located, designating the base as accurately blow molded if the etching is located at a predetermined location of the base, and designating the base as not accurately blow molded if the etching is not located at the predetermined location of the base.

8 Claims, 5 Drawing Sheets

(51) Int. Cl.
*B29C 49/12* (2006.01)
*B29L 31/00* (2006.01)

(52) U.S. Cl.
CPC . *B29B 2911/141* (2013.01); *B29B 2911/1476* (2013.01); *B29B 2911/14246* (2013.01); *B29B 2911/14486* (2013.01); *B29B 2911/14753* (2013.01); *B29L 2031/7158* (2013.01)

(56) References Cited

U.S. PATENT DOCUMENTS

| | | | |
|---|---|---|---|
| 4,892,205 A | 1/1990 | Powers et al. | |
| 5,455,088 A * | 10/1995 | Deemer | B29B 11/08 |
| | | | 428/35.7 |
| 5,902,526 A * | 5/1999 | Davis | B29C 49/00 |
| | | | 264/40.1 |
| 6,620,352 B1 * | 9/2003 | Davis | B29C 49/78 |
| | | | 264/40.4 |
| 9,994,378 B2 * | 6/2018 | Wurster | B65D 1/0276 |
| 2015/0037518 A1 | 2/2015 | Haner et al. | |
| 2016/0176604 A1 * | 6/2016 | Matsuo | B65D 1/0223 |
| | | | 215/373 |

OTHER PUBLICATIONS

International Search Report and Written Opinion issued in PCT/US2015/055977, dated May 13, 2016.

\* cited by examiner

ETCHED PREFORM TIP

CROSS-REFERENCE TO RELATED APPLICATIONS

This application is a 371 U.S. National Phase Application under 35 U.S.C. 371 of International Application No. PCT/US2015/055977, filed Oct. 16, 2015 and published in English as WO 2017/065803 A1 on Apr. 20, 2017. The entire disclosure of the above application is incorporated herein by reference.

FIELD

The present disclosure relates to a container preform having an etched tip.

BACKGROUND

This section provides background information related to the present disclosure, which is not necessarily prior art.

As a result of environmental and other concerns, plastic containers, more specifically polyester and even more specifically polyethylene terephthalate (PET) containers, are being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

While current preforms and containers are suitable for their intended use, they are subject to improvement. For example, in some instances a container base may not be properly formed during blow molding, resulting in incorrect material distribution. It would therefore be desirable to be able to identify such improperly formed containers during manufacturing, such as visually using machine vision for example. A container having reduced weight would also be desirable, as would a preform configured to improve interaction with a stretch rod during blow molding. The present teachings provide an improved preform that satisfies these needs in the art, as well as numerous others, and provides numerous advantages as one skilled in the art will recognize.

SUMMARY

This section provides a general summary of the disclosure, and is not a comprehensive disclosure of its full scope or all of its features.

The present teachings provide for a method of inspecting a blow molded container having a finish, a base, a body between the finish and base, and etching at the base. The method includes identifying where on the base the etching is located, designating the base as accurately blow molded if the etching is located at a predetermined location of the base, and designating the base as not accurately blow molded if the etching is not located at the predetermined location of the base.

The present teachings further provide for a container formed from a preform by stretch blow molding. The container includes a finish at a first end of the container. The finish is configured to cooperate with a closure to close the container. A base is at a second end of the container that is opposite to the first end. A body is between the finish and the base. An etched portion of the base includes etching that is a visual indicator configured to show whether the base is accurately blow molded or not accurately blow molded. When the etching is at a predetermined location of the base, the base is accurately blow molded. When the etching is not at the predetermined location of the base, the base is not accurately blow molded.

The present teachings further provide for a preform configured to form a container by stretch blow molding. The preform includes a finish portion at a first end of the preform. The finish portion is a container finish of the container. A base portion is at a second end of the preform that is opposite to the first end of the preform. The base portion is configured to form a container base of the container. A body portion is between the finish portion and the base portion. The body portion is configured to form a body of the container. An etched portion of the base portion includes etching that is a visual indicator configured to show when the container base is accurately blow molded and when the container base is not accurately blow molded.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
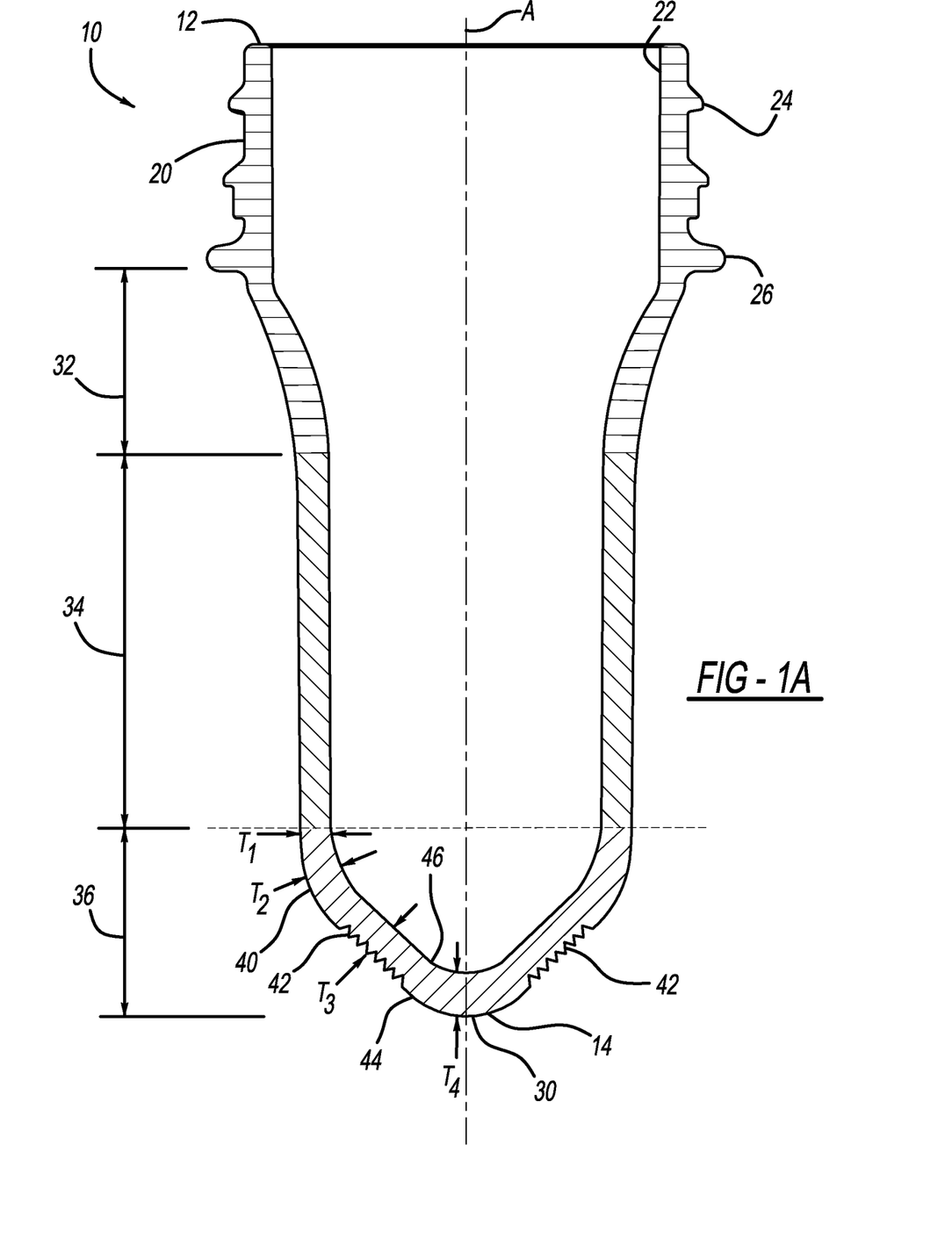
FIG. 1A is a cross-sectional view of a container preform according to the present teachings.

With initial reference to FIG. 1A, a preform according to the present teachings is generally illustrated at reference numeral 10. The preform 10 can be made of any suitable material. For example, the preform 10 can be made of any suitable blow-molded thermoplastic, including PET, LDPE, HDPE, PP, PS, and the like. The preform 10 can be formed in any suitable manner. For example, the preform 10 can be formed by injection molding thermoplastic into the cavity and core of an injection mold tool.

Figure 1B:
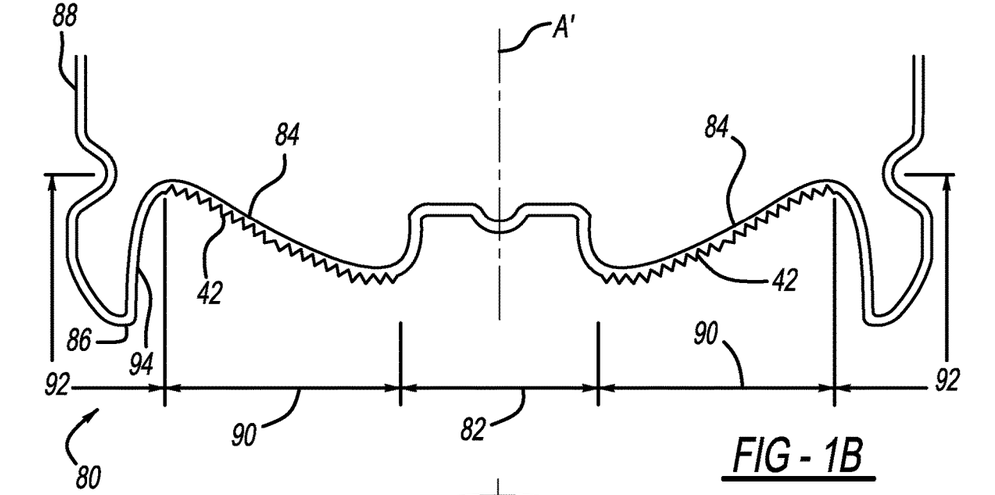
FIG. 1B is a cross-sectional view of a base of a container formed from the preform of FIG. 1A.
Figure 1C:
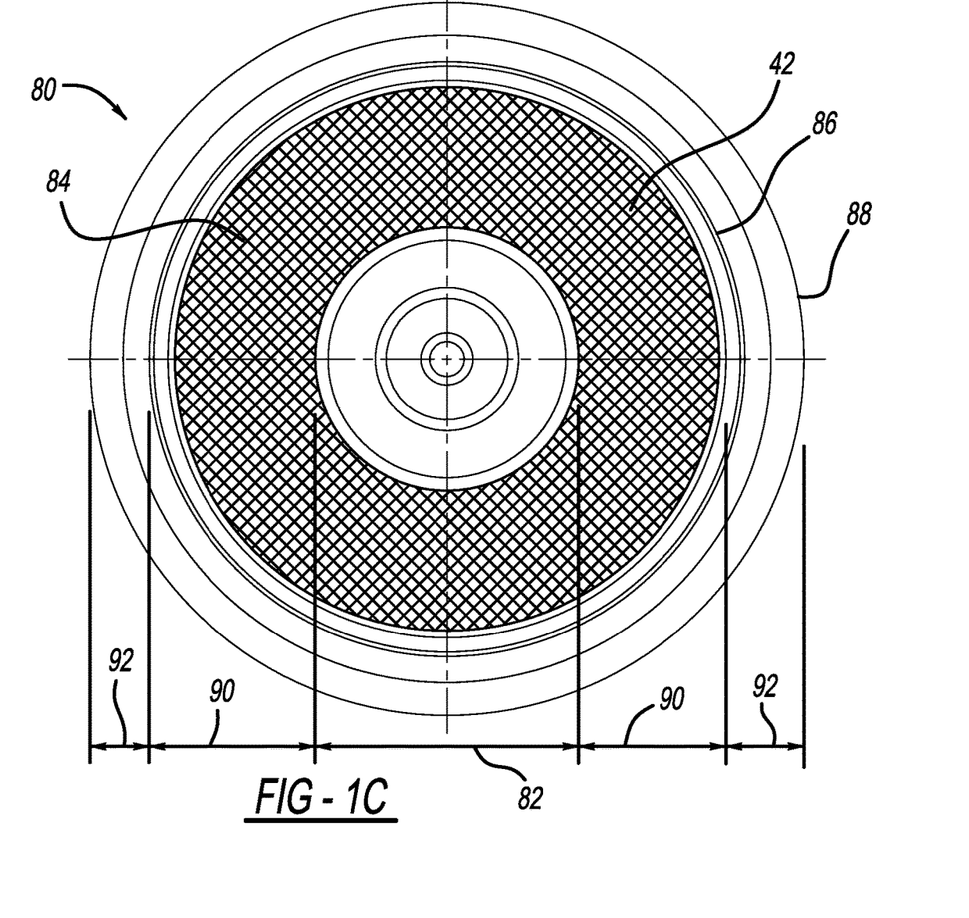
FIG. 1C is a bottom plan view of the container base of FIG. 1B.

The preform 10 is configured to form a container by injection blow molding. The container can be any suitable container for storing any suitable commodity, such as liquid beverages, food, or other hot-fill type materials. The container can have any suitable shape or size. The preform 10 is configured to form a container having a container base 80 as illustrated in FIGS. 1B and 1C, or any other suitable base. The preform 10 can be a CSC 64 ounce preform, for example.

The preform 10 generally includes a first end 12 and a second end 14 opposite thereto. At the first end 12 is a finish portion 20 of the preform 10, which is also a container finish of the container formed from the preform 10. At the first end 12 the finish portion 20 defines an opening 22 of the preform 10, which also provides a container opening of the container formed from the preform 10. Extending from an outer surface of the finish portion 20 are threads 24, which can be any suitable threads configured to cooperate with a closure for closing the opening 22. Also extending from the finish portion 20 is a support 26, which can be used for supporting the preform 10 in a stretch blow molding machine, and which may provide the finish portion 20 with increased strength.

At the second end 14 of the preform 10 is a tip 30, which is at an axial center A of the preform. Between the finish portion 20 at the first end 12 and the tip 30 at the second end 14, the preform 10 includes a shoulder portion 32, a body portion 34, and a base/heel portion 36. The shoulder portion 32 is adjacent to, or generally adjacent to, the finish portion 20. The base/heel portion 36 extends from the second end 14 towards the first end 12. The body portion 34 is between the shoulder portion 32 and the base/heel portion 36. The shoulder portion 32 is configured to form a container shoulder of the container blow molded from the preform, and may be configured to form a container neck as well. The body portion 34 is configured to form a container main body portion generally defined by a sidewall 88 (FIG. 1B) of the container. The base/heel portion 36 is configured to form the container base 80 (FIGS. 1B and 1C), which is further described herein.

The base/heel portion 36 of the preform 10 includes a curved portion 40. Between the tip 30 and the curved portion 40 is an etched portion including etching 42. The etching 42 extends around an entire circumference of the base/heel portion 36 of the preform 10, and thus extends about an entire circumference of container base 80 blow molded from the preform 10, as illustrated in FIG. 1C for example. The etching 42 advantageously reduces the overall weight of the resulting container base 80, particularly at zone 90, which can facilitate flexing of zone 90.

Figure 2A:
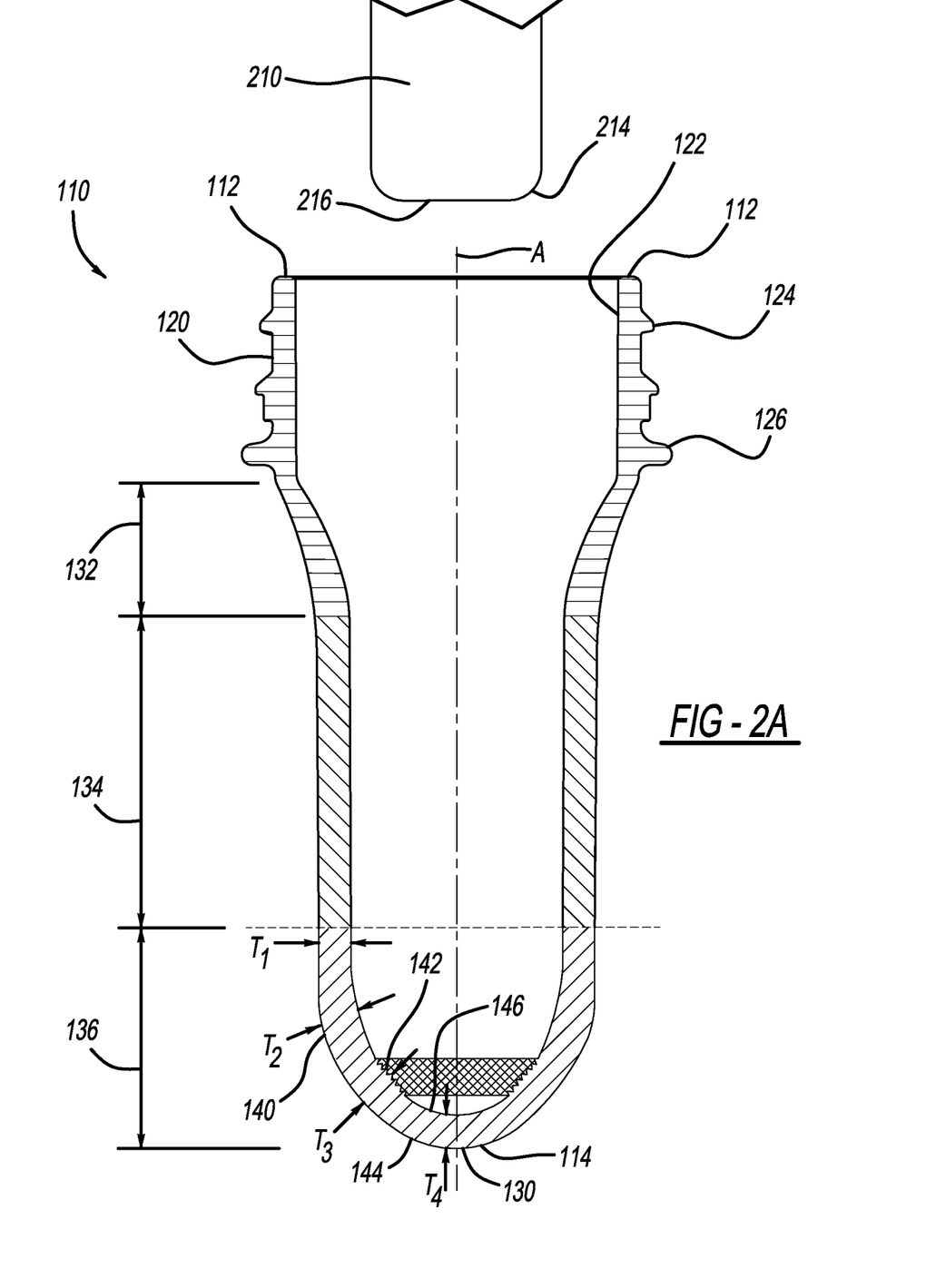
FIG. 2A is a cross-sectional view of another container preform according to the present teachings and a tip of a stretch rod used to stretch the preform during blow molding.

The etching 42 can be at an outer surface 44 of the preform 10, as illustrated in FIG. 1A, or at an inner surface 46 of the preform 10, as illustrated in FIG. 2A. The inner surface 46 is generally opposite to the outer surface 44. The etching 42 can be formed in any suitable manner, such as by using a multiple axis laser to directly etch the preform, or to etch the cavity and/or core of an injection molding tool and then injection molding the thermoplastic preform 10, whereby the etching pattern 42 is transferred to the surface of the preform 10. The etching 42 can be at the outer surface 44, or the etching 42 can be at the inner surface 46, or at both locations. The etching 42 can also be formed by sand or bead blasting the preform 10 or the preform injection molding tool. The present teachings also provide for forming the etching 42 by chemically etching the preform 10 or the preform injection molding tool. The etching 42 can also be formed by machining the preform 10 or the preform injection molding tool with the etching pattern. The etching 42 can be a custom etch MT-11040 pattern at 0.005 inches in depth, for example. The etching pattern 42 may be of various suitable geometries and depth, ranging from fine to course.

As described herein, the etching 42 serves as a visual indicator configured to show when the container base 80 (FIG. 1B) is accurately blow molded. In addition to, or in place of, the etching 42, any other suitable visual indicator that can show when the container base is accurately blow molded can be used. The etching 42 or other suitable visual indicator, can be located at any other suitable portion of the preform 10, such as at any other suitable portion of the base/heel portion 36.

If the etching 42 is at or confined to a predetermined area of the container base 80, such as region 84 as described herein and illustrated in FIGS. 1B and 1C, then the container base 80 can be considered to be accurately blow molded. If the etching 42 is not at or confined to the predetermined area of the container base 80, such as the region 84, then the container base 80 can be visually recognized as being inaccurately blow molded. This visual recognition can be by machine vision, for example, or by one skilled in the art using their naked eye. Visual recognition by machine vision can be accomplished by using a camera to inspect the etching 42 on each container after blow molding and comparing it to pre-established limits to determine if the etching pattern 42 is centered (symmetry) and within the required zone. The inspection process will result in the acceptance of accurately blow molded containers, and the rejection of inaccurately blow molded containers.

With reference to FIG. 1B and FIG. 1C, the container base 80 as accurately blow molded from the preform 10 is illustrated. The container base 80 generally includes a center push-up portion 82, a region 84, and the heel 86. The center push-up portion 82 is at an axial center A' of the container base 80, and the heel 86 is at an outer periphery of the container base 80. Extending from the heel 86 is sidewall 88 of the container body formed by the body portion 34 of the preform 10.

The region 84 is between the center push-up portion 82 and the heel 86. In some applications, the region 84 can optionally be a diaphragm, which may be flexible. The region 84 is within zone 90 of the container base 80, and the heel 86 is within a rigid zone 92 of the container base 80. The etching 42 is confined to the region 84 within the zone 90, thus indicating that the container base 80 has been accurately blow molded from the preform 10. The heel 86 is within zone 92, which further indicates that the container base 80 has been accurately blow molded.

If the etching 42 appears outside of the region 84 and zone 90, such as within zone 92, this would be a visual indication that the container base 80 had not been properly blow molded, and that the material of the preform 10 had not been properly distributed about the container base 80. For example, if the etching 42 is arranged on vertical wall 94, during manufacturing a machine operator or an automated detection device, such as machine vision, would be able to visually determine that the container base 80 had not been properly blow molded. Similarly, if the etching 42 is at the center push-up portion 82, this would be a visual indication that the container base 80 was not accurately blow molded. But if the etching 42 is confined to zone 90 as illustrated in FIGS. 1B and 1C, such as confined to the region 84, this is a visual indication that the container base 80 has been accurately blow molded and that the material weight of the container base 80 has been properly distributed about the container base 80.

Figure 2B:
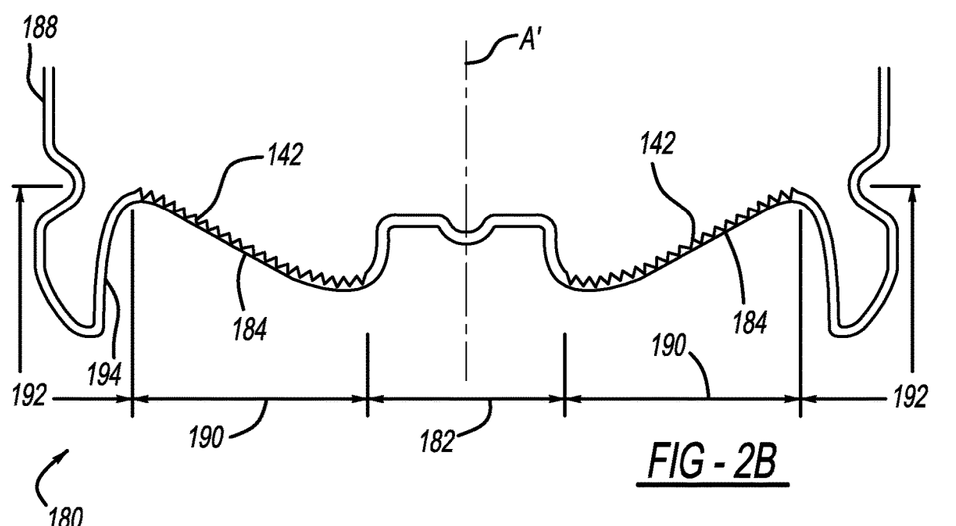
FIG. 2B is a cross-sectional view of a base of a container formed from the preform of FIG. 2A.

Another preform according to the present teachings is illustrated in FIG. 2A at reference numeral 110. FIG. 2B illustrates an exemplary container base 180 blow molded from the preform 110 of FIG. 2A. The preform 110 is similar to the preform 10 and the container base 180 is similar to the container base 80, thus like features are illustrated using the same reference numerals but increased by 100. The description of these like features set forth above in the description of the preform 10 and the container base 80 also applies to the preform 110 and the container base 180. Unlike the preform 10, the preform 110 has a base/heel portion 136 with a generally hemispherical shape in cross-section. Furthermore, the etching 142 is at the inner surface 146 of the preform 110, which is in contrast to the etching 42 located at the outer surface 44 of the preform 10. The etching 142 can be formed in any suitable manner, such as etching the core of an injection mold tool with a multiple axis laser, and injection molding the preform 110 to transfer the etching pattern to the inside surface of the preform. The etching 142 extends about an inner radius of the preform 110 at the inner surface 146 thereof.

The base/heel portion 136 is sized and shaped, particularly at the inner surface 146 thereof, to mate with a stretch rod 210 having a tip 212. The tip 212 is arranged such that it mates with the etching 142 when the stretch rod 210 is engaged with the preform 110 during blow molding, which improves interaction between the stretch rod 210 and the preform 110, thereby facilitating accurate blow molding of a container including the container base 180 of FIG. 2B from the preform 110. For example and as illustrated in FIG. 2A, the stretch rod 210 can be arranged such that an edge 214 at a distal end 216 thereof contacts etching 142.

FIG. 2B is a cross-sectional view of the container base 180 accurately blow molded from the preform 110, as evidenced by the etching 142 being confined to the region 184 of zone 190. Thus using machine vision or by manual inspection, it can be readily determined that the container base 180 has been properly formed and that material has been properly distributed about the container base 180. In contrast, if the container base 180 is blow molded such that the etching 142 extends outside of zone 190, such as to zone 192 or the central push-up portion 182, it can be visually determined that the container base 180 was not accurately blow molded, such as by visual manual inspection or machine vision, and the container including the container base 180 can be dealt with using any suitable quality control measures.

Figure 3A:
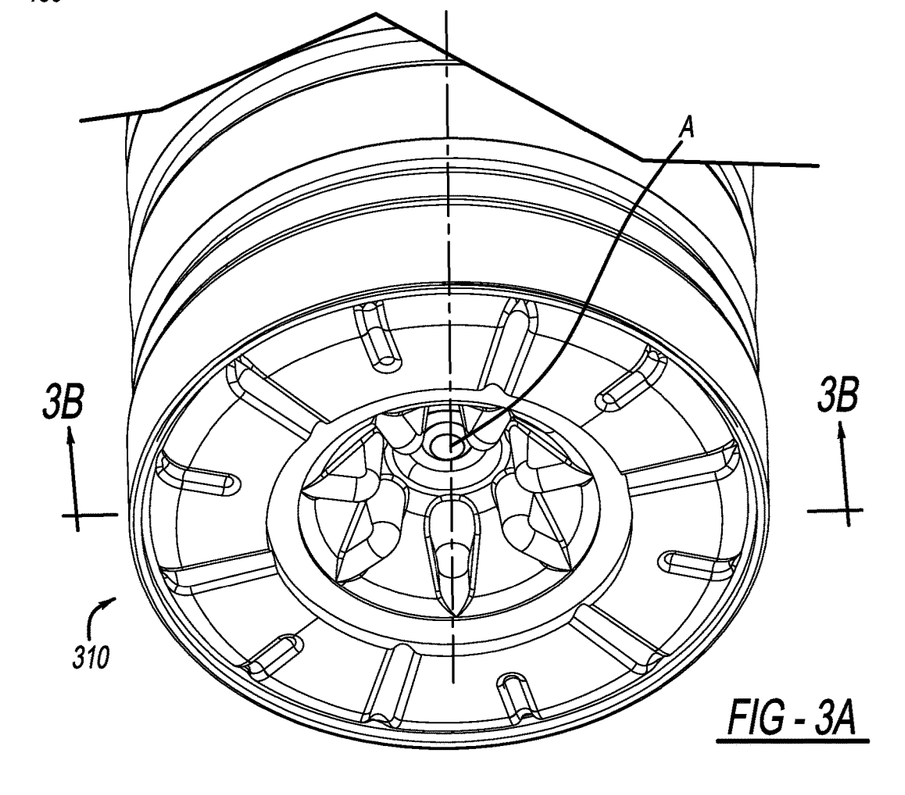
FIG. 3A illustrates another container base formed in accordance with the present teachings, such as from the preform of FIG. 2A.
Figure 3B:
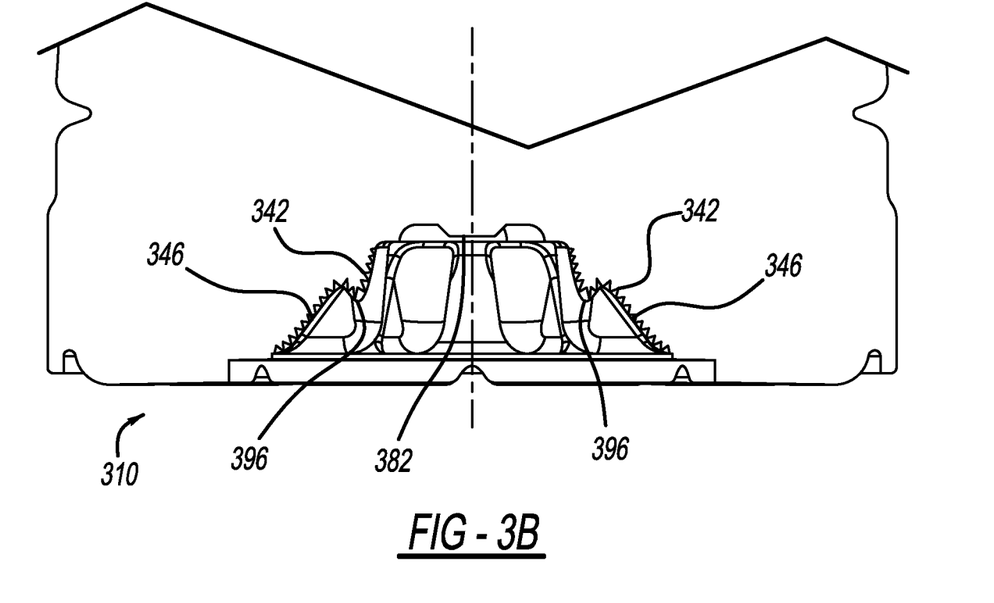
FIG. 3B is a cross-sectional view taken along line 3B-3B of FIG. 3A.

The container bases 80 and 180 are provided for exemplary purposes only. In addition to the container bases 80 and 180, the preforms 10 and 110 can be used to make any other suitable container base, such as any suitable rigid container base. For example, and with reference to FIGS. 3A and 3B, an additional container base 310 is illustrated, which has been blow molded from the preform 110. The container base 310 includes etching 342 at an inner surface 346 of center portion 382, and particularly at sidewalls 396 thereof. FIGS. 3A and 3B illustrate the container base 310 as accurately blow molded from a preform, such as the preform 110 of FIG. 2A. If inspection of the container base 310 reveals that the etching 342 is not confined to the sidewalls 396, or any other suitable location, it can be determined that the container base 310 was not accurately blow molded. The container base 310 can then be disposed of or dealt with in any suitable manner in accordance with standard quality control processes.

Thus by including the etching 42 or 142 in the preforms 10 or 110, or any other suitable preform, the present teachings provide numerous advantages. For example, the etching 42/142 advantageously reduces the weight of the resulting container base, such as the container bases 80, 180, or 310. Furthermore, the etching 42/142, or any other suitable indicator, provides a visual indicator that facilitates identification of inaccurately blow molded container bases. For example, if the etching 42/142, or other suitable visual indicator, does not appear at a predetermined location of a blown container base, such as at zones 90 and 190 of the container bases 80 and 180 respectively, or at the sidewall 396 of the center portion 382 of the container base 310 (or is confined to these areas), it can be determined visually that the container bases 80, 180, or 310 have been inaccurately blow molded. The etching 42 and 142 thus provides a visual cue for identifying whether or not the container bases 80, 180, 310 have proper material and weight distribution.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A container formed from a preform by stretch blow molding, the container comprising:
    a finish at a first end of the container, the finish configured to cooperate with a closure to close the container;
    a base at a second end of the container that is opposite to the first end, the base including a center push-up portion at an axial center of the base, a heel at an outer periphery of the base, and a flexible diaphragm between the center push-up portion and the heel;
    a body between the finish and the base; and
    an etched portion at the flexible diaphragm of the base, etching of the etched portion is a visual indicator configured to show whether the base is accurately blow molded or not accurately blow molded, the etching is confined to the flexible diaphragm and is configured to make the flexible diaphragm relatively lighter than each of the center push-up portion and the heel to make the flexible diaphragm relatively more flexible than each of the center push-up portion and the heel;
    wherein:
        when the etching is at a predetermined location of the base, the base is accurately blow molded;
        when the etching is not at the predetermined location of the base, the base is not accurately blow molded; and
        the etching is at only one of an outer surface and an inner surface of the base.

2. The container of claim 1, wherein the etching is one of laser etched, chemically etched, bead blasted, and machined.

3. The container of claim 1, wherein the etching is recognizable by machine vision.

4. The container of claim 1, wherein the preform from which the container is formed has a distal portion with a conical shape in cross-section, the preform configured to mate with a stretch rod during stretch blow molding.

5. The container of claim 1, wherein the preform from which the container is formed is etched between a tip of the preform and a curved portion of the preform, the curved portion is at a heel of the base of the container when the base is accurately blow molded.

6. The container of claim 1, wherein the preform from which the container is formed is etched at a contact point between the preform and a stretch rod during stretch blow molding.

7. The container of claim 1, wherein the etching extends continuously around the flexible diaphragm of the base.

8. The container of claim 7, wherein the etching extends in a circular pattern.

* * * * *

UNITED STATES PATENT AND TRADEMARK OFFICE
CERTIFICATE OF CORRECTION

Page 1 of 1

PATENT NO.        : 10,683,126 B2
APPLICATION NO.   : 15/768245
DATED             : June 16, 2020
INVENTOR(S)       : Michael T. Lane et al.

It is certified that error appears in the above-identified patent and that said Letters Patent is hereby corrected as shown below:

On the Title Page

Item (73) Assignee: "AMCR RIGID PACKAGING USA, LLC" should be --AMCOR RIGID PACKAGING USA, LLC--

Item (56) FOREIGN PATENT DOCUMENTS "JP 102198821" should be --JP H02198821--

Signed and Sealed this
Sixth Day of October, 2020

Andrei Iancu
*Director of the United States Patent and Trademark Office*